(12) United States Patent
Park et al.

(10) Patent No.: US 9,181,977 B2
(45) Date of Patent: Nov. 10, 2015

(54) AIR-FOIL BEARING

(71) Applicant: KOREA INSTITUTE OF MACHINERY & MATERIALS, Daejeon (KR)

(72) Inventors: Cheol-hoon Park, Daejeon (KR); Sang-Kyu Choi, Daejeon (KR); Doo Euy Hong, Daejeon (KR); Tae Gwang Yoon, Daejeon (KR); Sung Hwi Lee, Daejeon (KR); Sang-Yong Ham, Daejeon (KR)

(73) Assignee: KOREA INSTITUTE OF MACHINERY & MATERIALS, Daejeon (KR)

( * ) Notice: Subject to any disclaimer, the term of this patent is extended or adjusted under 35 U.S.C. 154(b) by 0 days.

(21) Appl. No.: 14/489,780

(22) Filed: Sep. 18, 2014

(65) Prior Publication Data

US 2015/0086141 A1    Mar. 26, 2015

(30) Foreign Application Priority Data

Sep. 23, 2013  (KR) .................. 10-2013-0112435
Sep. 23, 2013  (KR) .................. 10-2013-0112452
Sep. 23, 2013  (KR) .................. 10-2013-0112480

(51) Int. Cl.
*F16C 32/06* (2006.01)
*F16C 17/04* (2006.01)
(Continued)

(52) U.S. Cl.
CPC ............. *F16C 17/042* (2013.01); *F16C 17/024* (2013.01); *F16C 27/02* (2013.01); *F16C 27/08* (2013.01); *F16C 17/24* (2013.01)

(58) Field of Classification Search
CPC ...... F16C 17/024; F16C 17/042; F16C 17/10; F16C 27/02; F16C 27/063; F16C 27/08
USPC .................................................. 384/103–106
See application file for complete search history.

(56) References Cited

U.S. PATENT DOCUMENTS 5,871,284 A  *  2/1999  Nadjafi et al. ................. 384/105
5,938,341 A  *  8/1999  Eccles ............................ 384/106

(Continued)

FOREIGN PATENT DOCUMENTS

JP      2003-262222        9/2003
JP      2003278751 A   *  10/2003

(Continued)

OTHER PUBLICATIONS

Kim, Tae Young, "Enhancement on Damping Characteristics of the Air Foil Bearings with Metal Mesh Structure" Korea University of School of Mechanical Engineering, Dec. 2010.
Cheol Hoon Park et al.—'Radial-thrust combo metal mesh foil bearing for microturbomachinery', Review of scientific instruments, vol. 84, Oct. 2013.

*Primary Examiner* — Phillip A Johnson
(74) *Attorney, Agent, or Firm* — Lex IP Meister, PLLC

(57) ABSTRACT

The present invention provides an air-foil bearing including a damper body, a front welding plate, and a front top foil for increasing durability, and which has a first bending mode. The damper body includes a front body portion, a rear body portion, and a front protruded portion protruded upward from the front body portion to have a flat protruded surface, and the front welding plate includes a front first contact portion in surface contact with a top surface of the front protruded portion and a front second contact portion which is a portion that is bent from the front first contact portion in surface contact with the front welding plate.

22 Claims, 22 Drawing Sheets

(51) Int. Cl.
  *F16C 17/02* (2006.01)
  *F16C 27/02* (2006.01)
  *F16C 27/08* (2006.01)
  *F16C 17/24* (2006.01)

(56) References Cited

U.S. PATENT DOCUMENTS 7,134,793 B2 11/2006 Thompson
2003/0169951 A1 9/2003 Nishijima et al.
2009/0039740 A1 2/2009 Sortore

FOREIGN PATENT DOCUMENTS

JP 2004-183830 7/2004
KR 10-2007-0058853 6/2007
KR 10-2012-006311 6/2012
KR 10-2012-0082177 7/2012
KR 10-2013-0019218 2/2013
WO 2010024473 3/2010

* cited by examiner (Gap formed from coupling)

(Folder fitted to 130)

ptions No. 10-2013-0112435, No.
AIR-FOIL BEARING

CROSS-REFERENCE TO RELATED APPLICATION

This application claims priority to and the benefit of Korean Patent Applications No. 10-2013-0112435, No. 10-2013-0112452 and No. 10-2013-0112480 filed in the Korean Intellectual Property Office on Sep. 23, 2013, the entire contents of which are incorporated herein by reference.

BACKGROUND OF THE INVENTION (a) Field of the Invention

The present invention relates to an air-foil bearing. More particularly, the present invention relates to an air-foil bearing which enables a simple configuration thereof, and enhances axis direction supporting capability and durability and mounting to a small rotating body such as a compressor or a turbine, to which mounting of a bearing is impossible or difficult.

(b) Description of the Related Art

In general, a machine having a rotating shaft provided thereto, such as a generator and a turbine, is provided with a thrust bearing for reducing axial direction vibration, together with a radial bearing for reducing radial direction vibration.

Particularly, in a case of the rotating body which rotates at a fast speed, along with the vibration reducing effect, the thrust bearing is required to be able to be used at a high temperature, and to have high durability for preventing the bearing from being damaged by an axis direction load.

Due to such conditions, in general, a fluid bearing or a bearing of a mode in which a fluid that serves as a lubricant is supplied to the bearing has been widely used as the thrust bearing.

However, in a case of a small machine such as a micro-gas turbine, although the small machine is required to rotate at a high speed for obtaining a desired output, the small machine is not suitable for connecting to a lubricant supplier thereto due to problems such as a volume thereof.

The fast rotating body is required to have a damping effect on the vibration generated due to the fast rotation, to be able to be used at a high temperature, and to have durability for preventing a bearing from being damaged by the axial direction load, thereby leading to demand for a non-contact oilless thrust bearing, which is becoming higher day by day.

The demand has led to suggestions regarding different non-contact oilless thrust bearing technologies, such as an air-foil bearing and an electro-magnetic bearing as typical examples.

As for the air-foil bearing, Korea Patent Registration No. 1204194 discloses "GAS-FOIL THRUST BEARING AND CENTRIFUGAL COMPRESSOR HAVING THE SAME", and as for the electro-magnetic bearing, U.S. Patent Laid-Open Publication No. 2009-0039740 discloses "MAGNETIC BEARING".

However, since the non-contact oilless thrust bearing has a complicated configuration to cause difficulty in manufacturing, particularly in manufacturing small-sized bearings with a diameter below 300 mm, and to have difficulty in improving manufacturing process accuracy, the non-contact oilless thrust bearing has problems in that productivity is poor and the bearing is expensive.

Particularly, a high axial direction thrust is liable to cause deformation of the air-foil thrust bearing to cause a problem of reducing a function of the bearing.

In the meantime, since the thrust bearing has an axial supporting direction, which is different from the radial direction of the radial bearing, the thrust bearing and the radial bearing are configured to have separate systems.

Since it is required to assemble two kinds of bearings after separately manufacturing them, while requiring a separate back plate for attaching the thrust bearing, which makes the manufacturing process complicated, steps for meeting assembly accuracy are required at the time of assembly.

Moreover, the air-foil bearing to be applied to the thrust bearing has a problem of having a very low axial direction load limitation.

Along with this, a process is required for manufacturing a complicated bump shape, and welding the thrust foil and the bump to a bearing housing.

That is, since the thrust bearing and the radial bearing have separate systems, a problem is caused in which the volume of a bearing portion is inevitably increased.

Particularly, there has been a problem in that, since the volume is increased when the radial bearing and the thrust bearing are applied, the small-sized rotating body having a compressor or turbine impeller must have the thrust bearing mounted to a back plate portion of the turbine or impeller for increasing a first bending mode.

Moreover, since the two kinds of bearings are required to be fabricated individually, a problem is caused in which the fabrication and assembly are complicated.

Along with this, mounting or assembly of an integrated bearing to the small rotating body, such as the compressor or the turbine, is impossible or difficult.

In order to solve above problems, U.S. Pat. No. 7,134,793 discloses "Thrust Bearing Assembly" which suggests a bearing assembly.

However, since the invention is limited to the thrust bearing which is not included to the non-contact oilless thrust bearing, the invention has a problem in that bearing durability for the axial direction load cannot be assured at the time of fast speed rotation.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an air-foil bearing having advantages of enhanced durability. An object of the present invention, devised to solve above problem, is to provide an air-foil bearing in which a pressed metal mesh of a fixed density is made to support a top foil of a thrust bearing for enhancing durability thereof.

Since the air-foil bearing of the present invention is constructed to be separable into unit modules or simplifies construction thereof for enabling mounting of the air-foil bearing to a small rotating body, such as a compressor or a turbine where mounting of the air-foil bearing thereto is impossible or difficult, the air-foil bearing has an excellent effect for application to the small rotating body, and enables construction of an integrated radial and thrust bearing to have an increased first bending mode owing to entire length of the rotating body which becomes short.

According to a first aspect of the present invention, an air-foil bearing includes: a damper body having a front body portion, a rear body portion, and a front protruded portion protruded upward from the front body portion to have a flat protruded surface; a front welding plate in surface contact with the front body portion; and a front top foil having a front first contact portion in surface contact with a top surface of the front protruded portion, and a front second contact portion which is a portion that is bent from the front first contact portion in surface contact with the front welding plate.

The damper body may be constructed of a metal mesh material.

The air-foil bearing may further include a back plate in surface contact with the rear body portion, and may further includes two or more welding supports arranged between the front welding plate and the back plate in contact with sides of the damper body, respectively.

There may be two or more front protruded portions arranged radially, and there may be two or more front top foils matched with the number of front protruded portions.

In a second aspect of the present invention, an air-foil bearing includes: a damper body having a front body portion, a rear body portion, and a front protruded portion protruded upward from the front body portion to have a flat protruded surface; a front welding plate in surface contact with the front body portion; a front top foil having a front first contact portion in surface contact with a top surface of the front protruded portion, and a front second contact portion which is a portion that is bent from the front first contact portion in surface contact with the front welding plate; a radial foil placed in, and secured to, a holding slot in the damper body; and a back plate in surface contact with the rear body portion.

The damper body is constructed of a metal mesh material.

The air-foil bearing may further include two or more welding supports arranged between the front welding plate and the back plate in contact with sides of the damper body, respectively.

The air-foil bearing may further include a fixing part for securing the radial foil to the damper body, and the radial foil is placed in the holding slot together with the fixing part after the radial foil is coupled to the fixing part.

There may be two or more front protruded portions arranged radially, and there may be two or more front top foils matched with the number of front protruded portions.

In a third aspect of the present invention, an air-foil bearing includes: a damper body having a front body portion, a rear body portion, a front protruded portion protruded upward from the front body portion to have a flat protruded surface, and a rear protruded portion protruded downward from the rear body portion to have a flat protruded surface; a front welding plate in surface contact with the front body portion; a front top foil having a front first contact portion in surface contact with a top surface of the front protruded portion, and a front second contact portion which is a portion that is bent from the front first contact portion in surface contact with the front welding plate; a rear welding plate in surface contact with the rear body portion; and a rear top foil having a rear first contact portion in surface contact with a top surface of the rear protruded portion, and a rear second contact portion which is a portion that is bent from the rear first contact portion in surface contact with the rear welding plate.

The damper body may be constructed of a metal mesh material.

The air-foil bearing may further include a radial foil placed in, and secured to, a holding slot in the damper body, and may further include a fixing part for securing the radial foil to the damper body, wherein the radial foil is placed in the holding slot together with the fixing part after the radial foil is coupled to the fixing part.

There may be two or more front protruded portions arranged radially, and there may be two or more front top foils matched with the number of front protruded portions.

There may be two or more rear protruded portions arranged radially, and there may be two or more rear top foils matched with the number of rear protruded portions.

The air-foil bearing may further include two or more welding supports arranged between the front welding plate and the rear welding plate in contact with sides of the damper body, respectively.

According to a fourth aspect of the present invention, each of the damper body, the front welding plate, and the rear welding plate may be separable into two or more units, wherein the air foil bearing includes two or more unit modules each having the unit damper bodies, the unit front welding plates, and the unit rear welding plates.

The unit modules may be coupled together to form a holding slot in the damper body, and a radial foil is placed in, and secured to, the holding slot.

At least one front protruded portion may be arranged and at least one front top foil may be provided to match with the front protruded portion.

At least one rear protruded portion may be arranged, and at least one rear top foil may be provided to match with the rear protruded portion.

The air-foil bearing may further include at least one welding support connected to the unit front welding plate and the unit rear welding plate in contact with a side of the unit damper body.

The air-foil bearing may further include a bridge arranged at a coupling point of two adjacent unit modules.

The radial foil may further include a fixing part for securing the radial foil to the damper body. The exemplary embodiments of the present invention have the following advantages. The supporting of the top foil of the thrust bearing with the pressed metal mesh of a fixed density enables enhancement of durability of the bearing.

Further, the integrated radial and thrust bearing has simplified construction, not only to provide an excellent effect when the bearing is applied to a small rotating body, and but also to increase a first bending mode owing to a short entire length of the rotating body.

In addition to this, the separable structure of the bearing into unit modules, enabling construction of the bearing of a module assembly of the unit modules, enables mounting of the bearing of the present invention even to the small rotating body, such as the compressor or the turbine, where mounting of the bearing thereto is impossible or difficult.

DETAILED DESCRIPTION OF THE EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Figure 1:
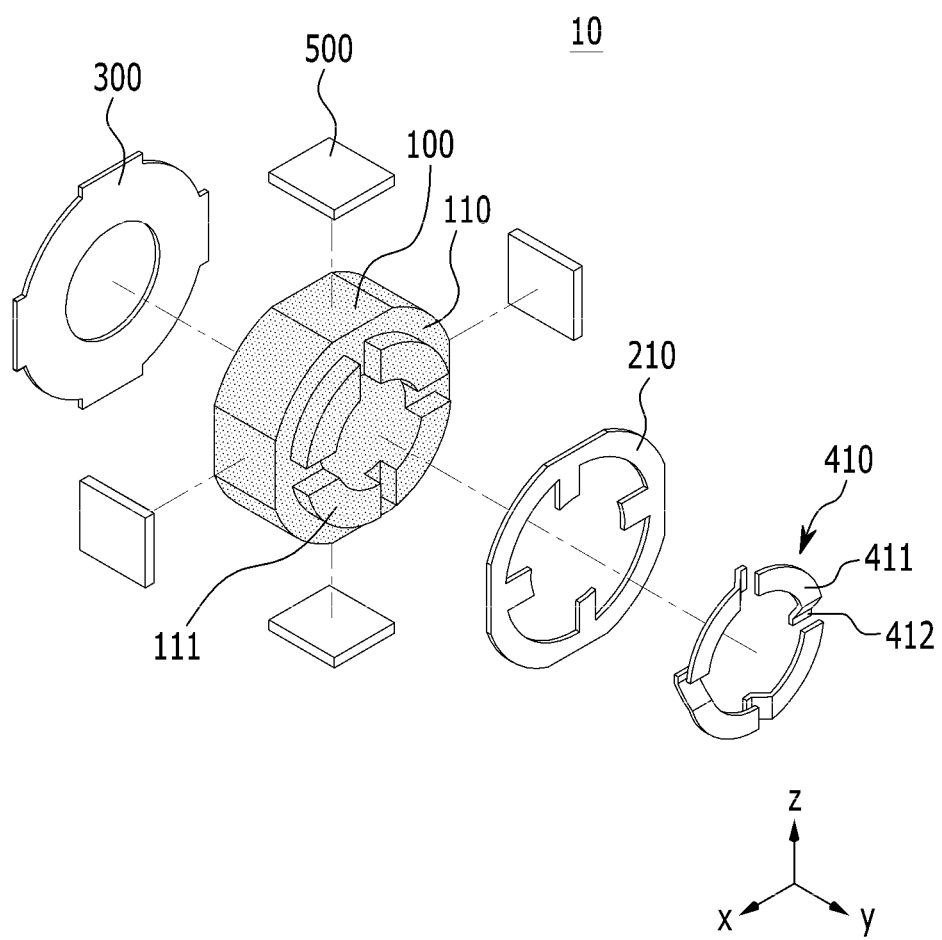
FIG. 1 illustrates an exploded perspective view of an air-foil bearing in accordance with a first exemplary embodiment of the present invention.
Figure 2:
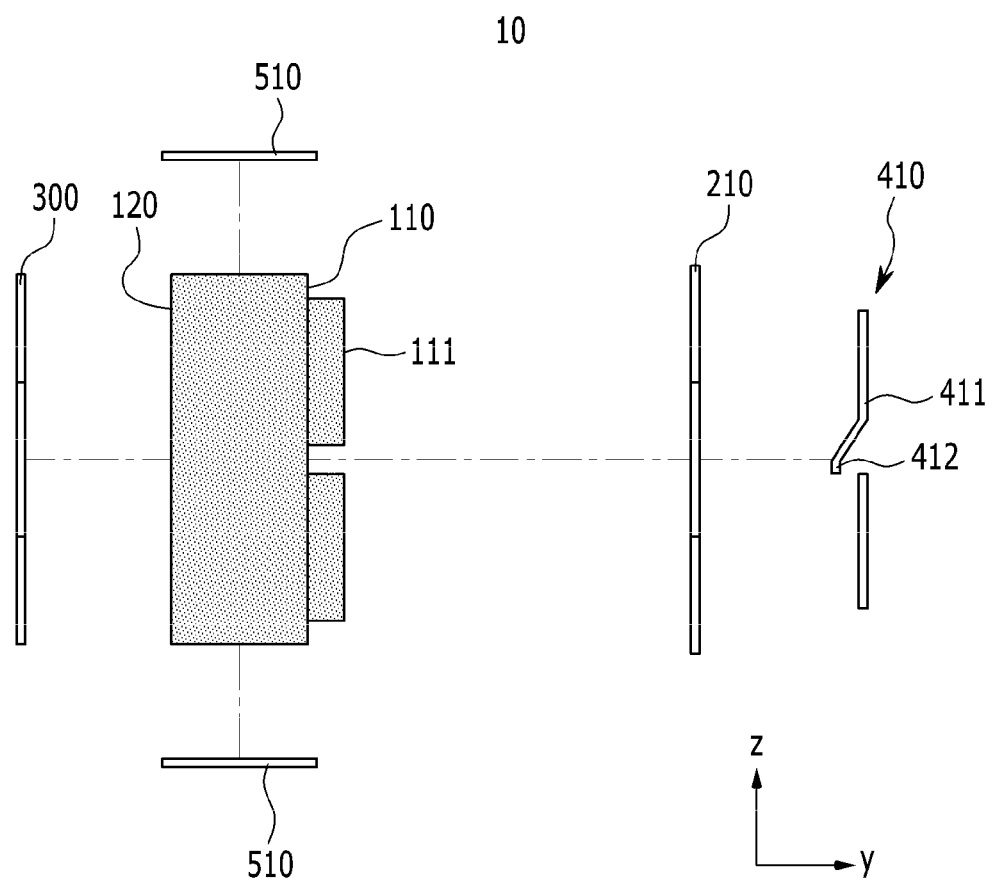
FIG. 2 illustrates an exploded sectional view of an air-foil bearing in accordance with a first exemplary embodiment of the present invention.
Figure 3:
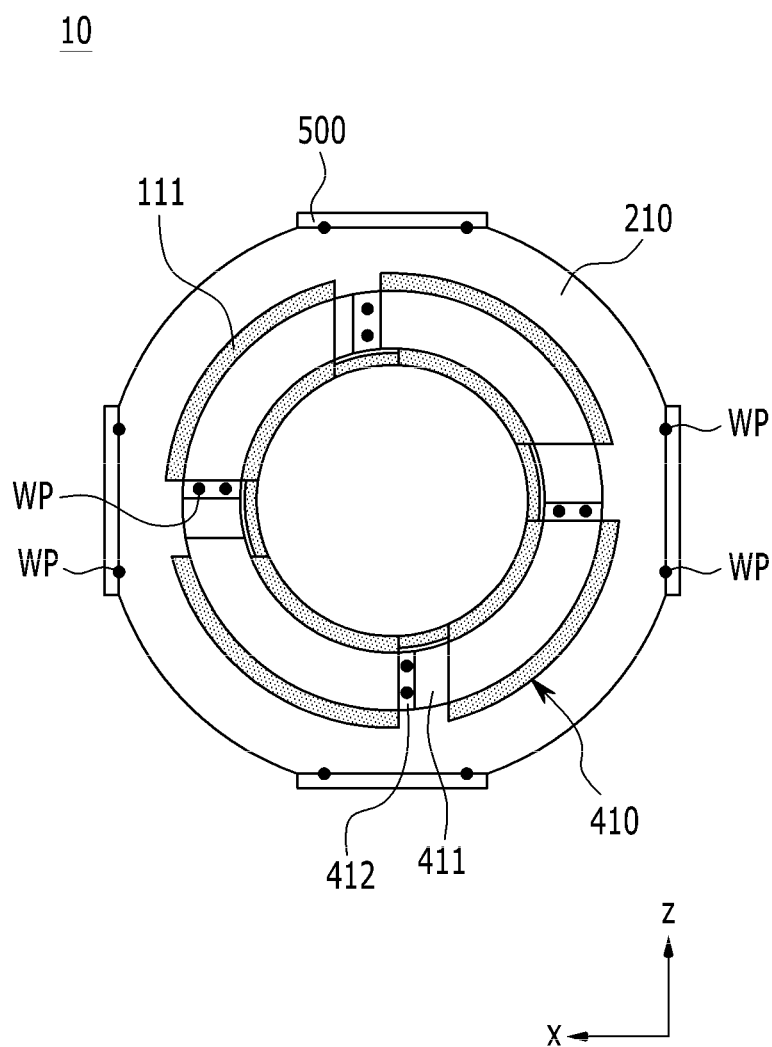
FIG. 3 illustrates a top plan view of an air-foil bearing in accordance with a first exemplary embodiment of the present invention.
Figure 4:
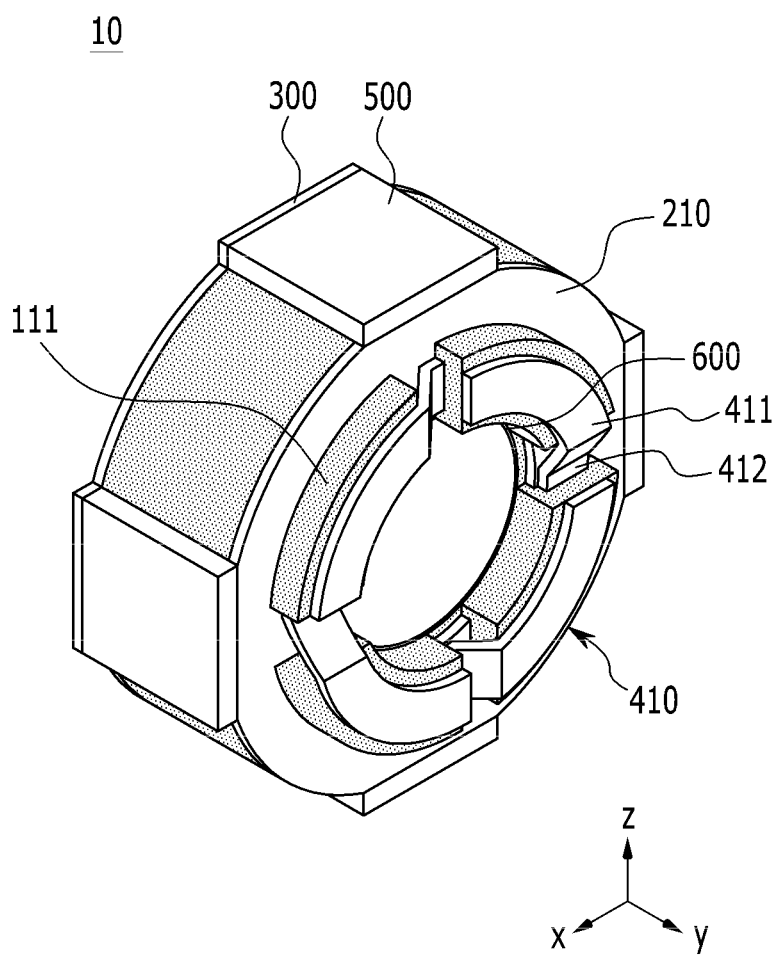
FIG. 4 illustrates a perspective view of an air-foil bearing in accordance with a first exemplary embodiment of the present invention.
Figure 5:
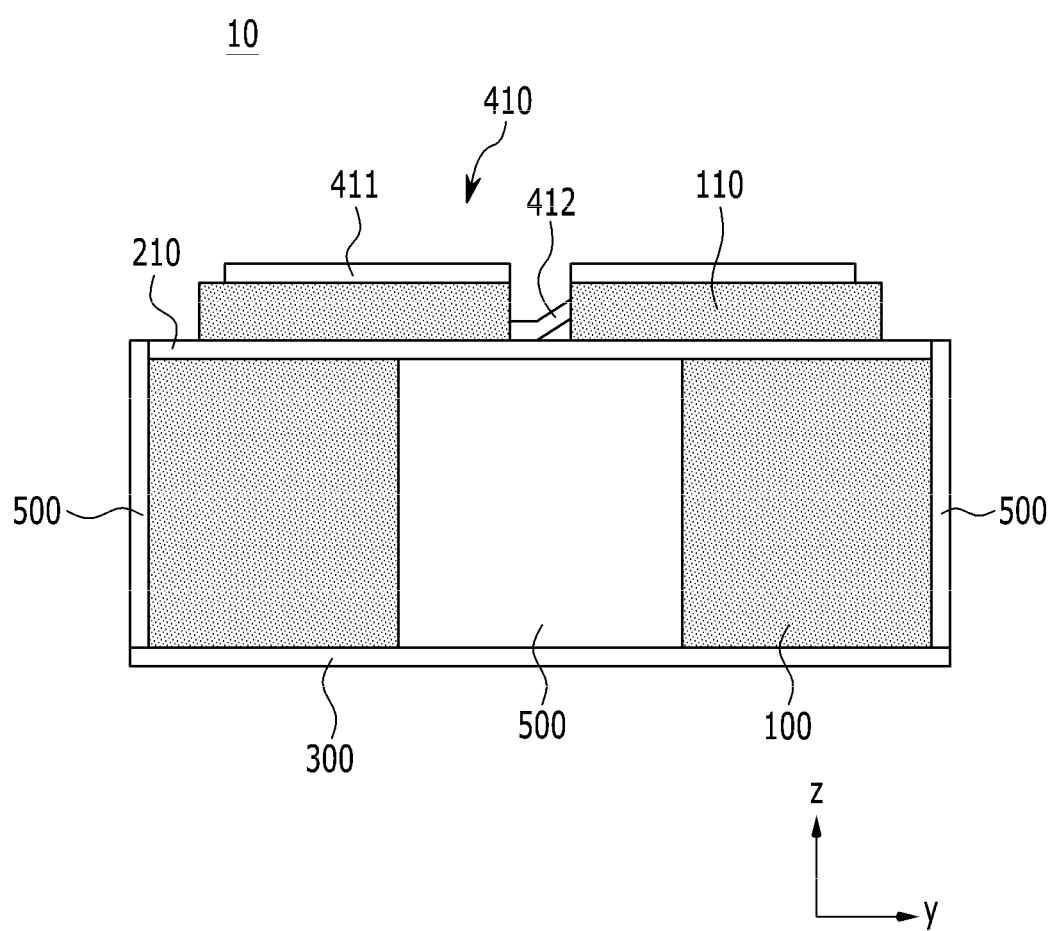
FIG. 5 illustrates a side view of an air-foil bearing in accordance with a first exemplary embodiment of the present invention.

FIGS. 1 to 5 illustrate an air-foil bearing 10 in accordance with a first exemplary embodiment of the present invention respectively, wherein FIG. 1 is an exploded perspective view, FIG. 2 is an exploded sectional view, FIG. 3 is a top plan view, FIG. 4 is a perspective view, and FIG. 5 is a side view.

Referring to FIGS. 1 to 5, the air-foil bearing 10 may include a damper body 100, a front welding plate 210, a back plate 300, a front top foil 410, and a welding support 500.

Referring to FIG. 1, the damper body 100 may include an annular body portion having a pass through portion formed in a center thereof. The body may include a front body portion 110 and a rear body portion 120. In the present exemplary embodiment, it is defined that the body portion has the pass through portion formed in a y-axis direction, a side facing the y-axis direction is the front body portion 110, and a side opposite to the front body portion 110 is the rear body portion 120.

A front protruded portion 111 may be formed to be protruded upward from the front body portion 110. The front protruded portion 111 may have a flat protruded surface. In the present exemplary embodiment, the front protruded portion 111 is protruded in the y-axis direction in FIG. 1, to have a protruded plane positioned on an xz plane.

There may be two or more radially arranged front protruded portions 111. In the present exemplary embodiment, although four of the front protruded portions 111 may be arranged to have a cross-section seen from the y-axis direction in FIG. 1 to be circular arcs, the scope of the present invention is not limited to this, and the front protruded portion 111 may be arranged with varied shapes of the damper body 100, the front welding plate 210, or the front top foil 410, and a connection system thereof with the front protruded portion 111 may be formed with many variations.

In the present exemplary embodiment, the damper body 100 may be constructed of metal mesh material. The metal mesh has a structure in which metal wires are woven in a form of a net to have elasticity and high durability. Thus, since the air-foil bearing 10 of the present exemplary embodiment has the damper body 100 of the metal mesh material, shape forming thereof becomes easy, manufacturing of the air-foil bearing 10 becomes easy owing to a reduction of a total number of components and an assembly process time, and manufacturing of a small number of the bearings and a lighter bearing becomes more favorable.

The front welding plate 210 may be in surface contact with the front body portion 110. Referring to FIG. 1, the front welding plate 210 may have an opening formed in conformity with a cross-section of the front protruded portion 111 seen from the y-axis direction for placing in, and securing to, the front protruded portion 111.

In the present exemplary embodiment, since the air-foil bearing 10 has the front welding plate 210, the difficulty of coupling, such as through direct welding, of the front top foil 410 to the damper body 100 of the metal mesh material can be supplemented.

The back plate 300 may be in surface contact with the rear body portion 120. The back plate 300 may have an opening formed therein in the y-axis direction in conformity with the pass through portion of the damper body 100. In the present exemplary embodiment, since the air-foil bearing 10 has the back plate 300 which couples to the rear body portion 120 for supporting a rear side of the damper body 100, the air-foil bearing 10 has an effect of maintaining the damper body 100 of the metal mesh material in a fixed shape together with the front welding plate 210.

Referring to FIGS. 2 to 5, the front top foil 410 may include a front first contact portion 411 in surface contact with the protruded surface of the front protruded portion 111, and a second contact portion 412 which is a portion that is bent from the first contact portion 411 in surface contact with the front welding plate 210. There may be two or more front top foils 410 to match to the number of the front protruded portions 111. In the present exemplary embodiment, the second contact portion 412 and the contact surface of the front welding plate 210 may be welded, and thereby secured together.

The welding support 500, arranged between the front welding plate 210 and the back plate 300, may be in contact with a side of the damper body 100. Referring to FIG. 1, two or more of the welding supports 500 may be arranged in contact with the sides of the damper body 100. In the present exemplary embodiment, although four of the welding supports 500 are arranged, the present invention is not limited to this, and the number of welding supports 500 may vary with shapes of the front welding plate 210 and the back plate 300, and a position of the damper body 100 may be formed with many variations.

The welding support 500 may be welded and thereby secured to the side of the damper body 100. Moreover, in the present exemplary embodiment, as the welding support 500 is welded and thereby secured to the front welding plate 210 and the back plate 300, the damper body 100 of the metal mesh material may more strongly maintain a fixed shape.

In the meantime, the respective contact surfaces of the front welding plate 210, the back plate 300, and the welding support 500 with the damper body 100 may be coupled by spot welding such as at spot welding portions WP as shown in FIG. 3.

According to the first exemplary embodiment, by supporting the top foil of the thrust bearing with the metal mesh of a fixed density, and improving the axial direction load with the front welding plate 210 and the back plate 300, the air-foil bearing 10 having enhanced durability can be provided.

Moreover, since separate fabrication of the bump foil is not required, the air-foil bearing 10 has a simple structure, can be manufactured easily, and can be applicable to a small rotating body as well.

Figure 6:
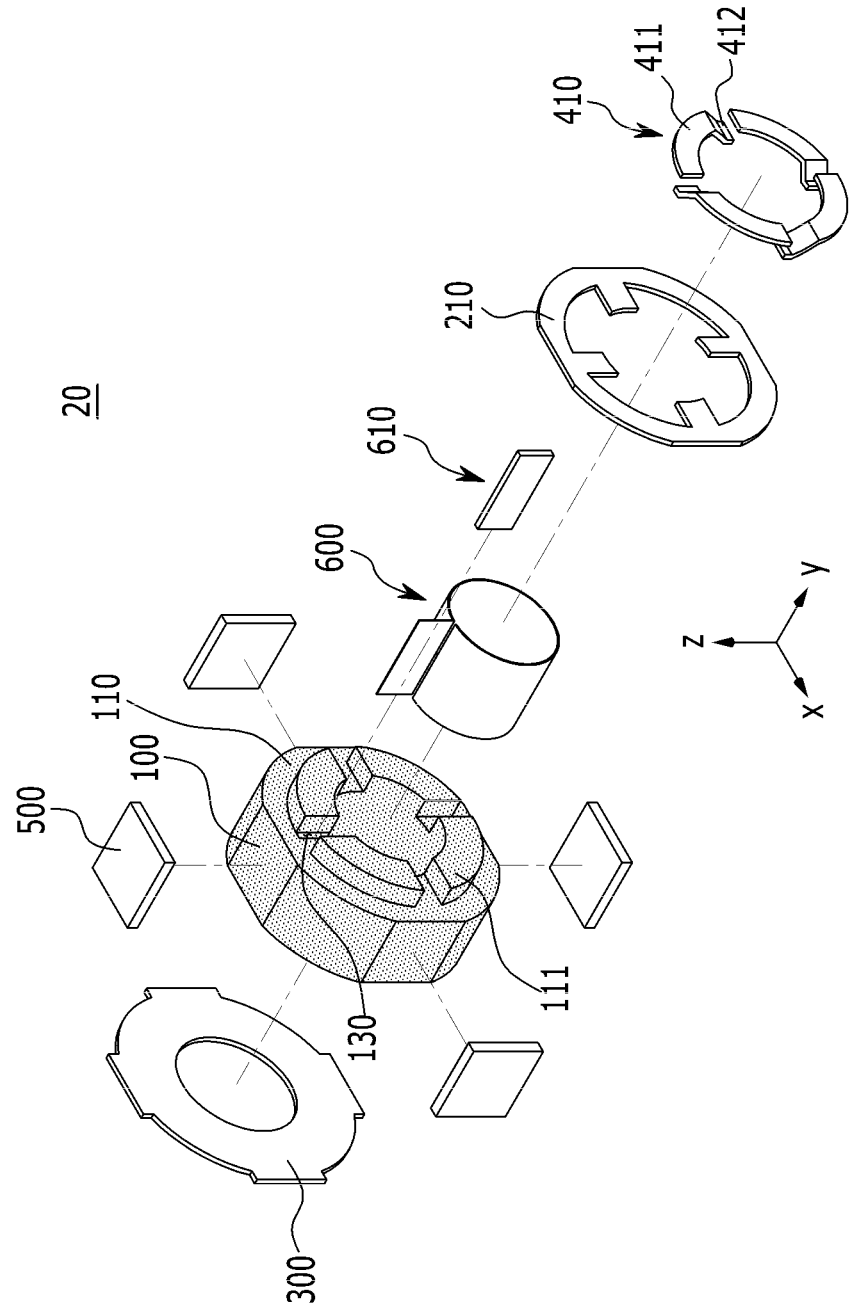
FIG. 6 illustrates an exploded perspective view of an air-foil bearing in accordance with a second exemplary embodiment of the present invention.
Figure 7:
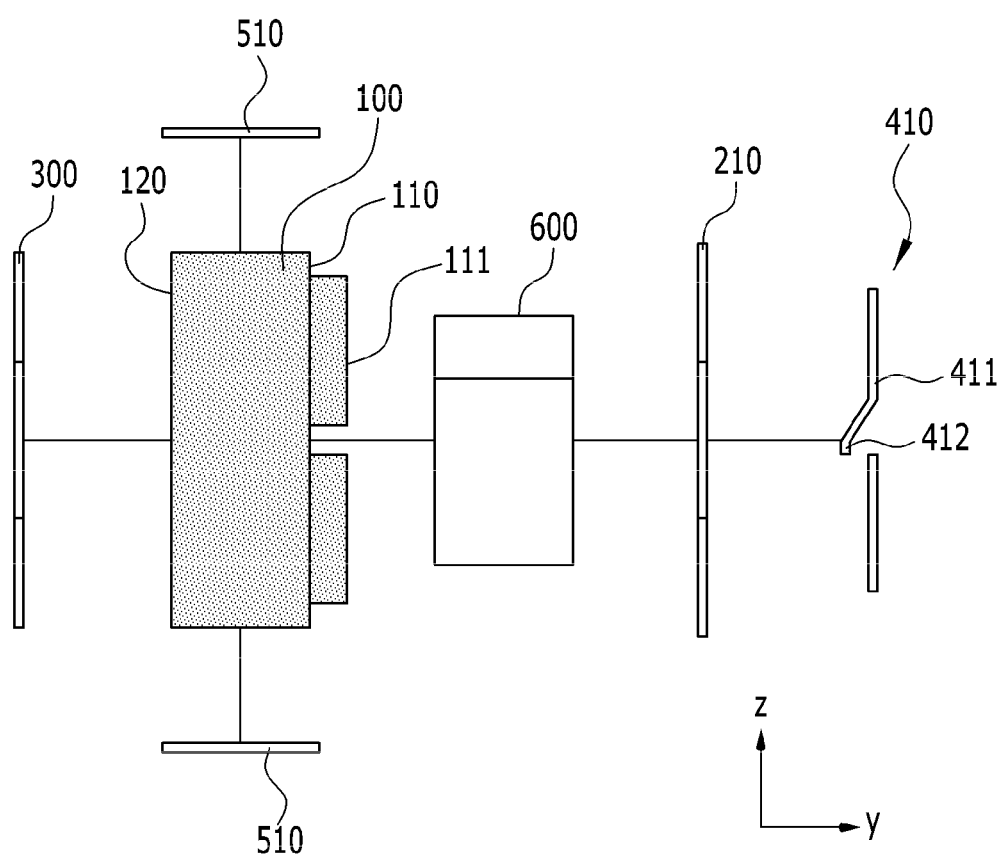
FIG. 7 illustrates an exploded sectional view of an air-foil bearing in accordance with a second exemplary embodiment of the present invention.
Figure 8:
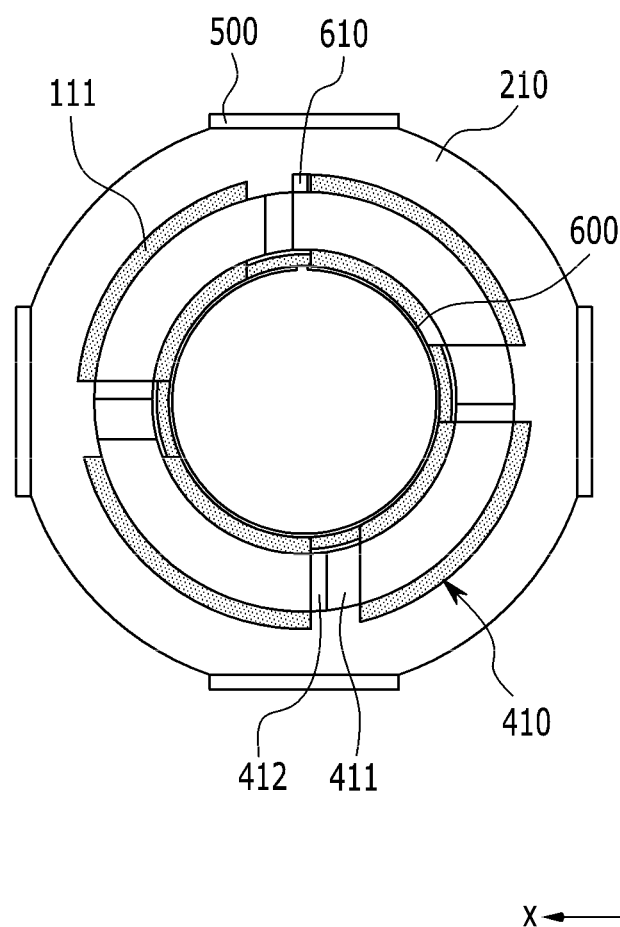
FIG. 8 illustrates a top plan view of an air-foil bearing in accordance with a second exemplary embodiment of the present invention.
Figure 9:
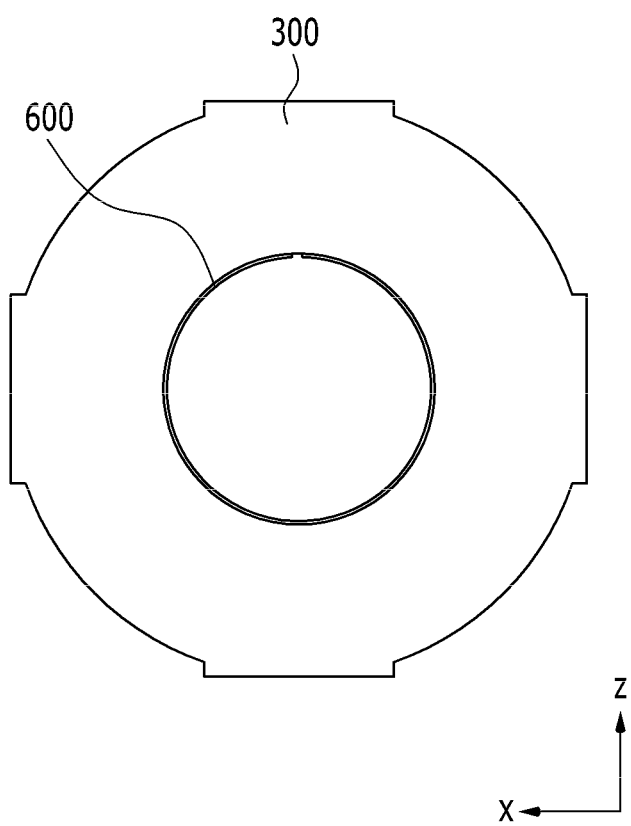
FIG. 9 illustrates a bottom view of an air-foil bearing in accordance with a second exemplary embodiment of the present invention.
Figure 10A:
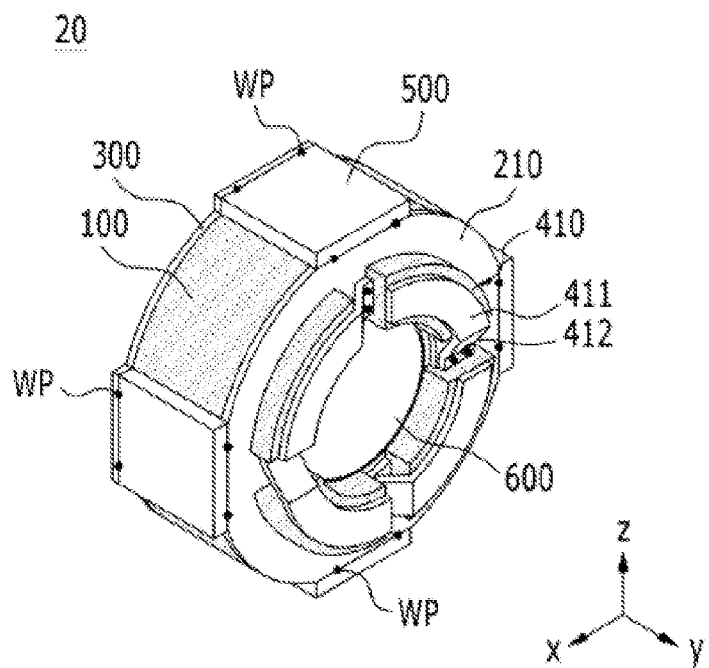
FIGS. 10A to 10B illustrate perspective views of an air-foil bearing in accordance with a second exemplary embodiment of the present invention.
Figure 10B:
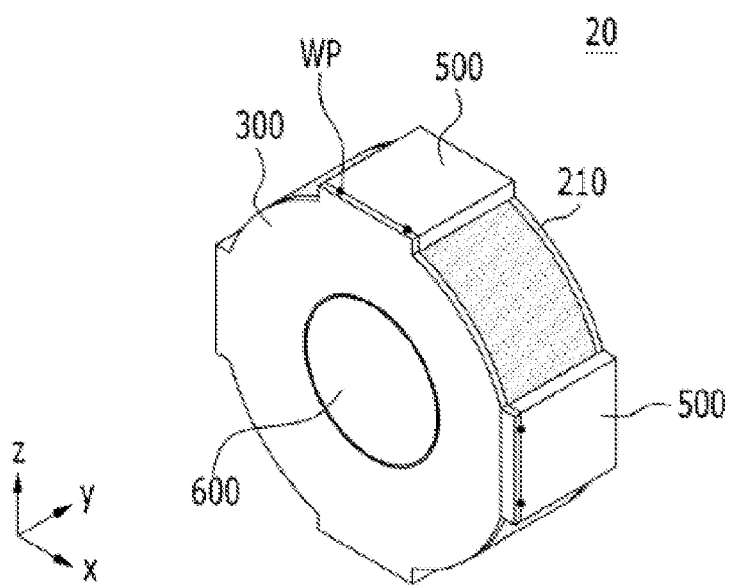

FIGS. 6 to 10 illustrate an air-foil bearing 20 in accordance with a second exemplary embodiment of the present invention, wherein FIG. 6 is an exploded perspective view, FIG. 7 is an exploded sectional view, FIG. 8 is a top plan view, FIG. 9 is a bottom view, FIG. 10A is a front perspective view, and FIG 10B is a rear perspective view.

Referring to FIGS. 6 to 9, the air-foil bearing 20 is identical to the air-foil bearing 10 in accordance with the first exemplary embodiment except the air-foil bearing 20 further includes a radial foil 600 and a fixing part 610. Members of the second exemplary embodiment that are the same as the members of the first exemplary embodiment will be given the same reference numerals.

Referring to FIGS. 6 to 10, the radial foil 600 may be placed in the damper body 100 by being passed through the openings of the pass through portion of the damper body 100, the front welding plate 210, and the back plate 300 at the same time. The damper body 100 has a holding slot 130 formed inside of the damper body 100 in contact with the radial foil 600 for securing the radial foil 600.

The fixing part 610 is placed in the holding slot 130 for securing the radial foil 600 to the damper body 100. After initial coupling to the radial foil 600, the fixing part 610 is placed in the holding slot 130 together with the radial foil 600, for securing the radial foil 600. In the present exemplary embodiment, although the fixing part 610 has a thin plate shape in conformity with the holding slot 130, the present invention is not limited to this, and shapes or coupling of the holding slot 130 and the fixing part 610 may be designed in a variety of modes for securing the radial foil 600 to the damper body 100, and may be formed with many variations.

Thus, the air-foil bearing 20 has both the front top foil 410 and the radial foil 600 provided thereto for making the air-foil bearing 20 function both as a radial bearing and a thrust bearing for simplifying a structure of the bearing, enabling easy application of the air-foil bearing 20 to the small rotating body and enhancing the first bending mode owing to a short entire length of the rotating body.

Figure 11:
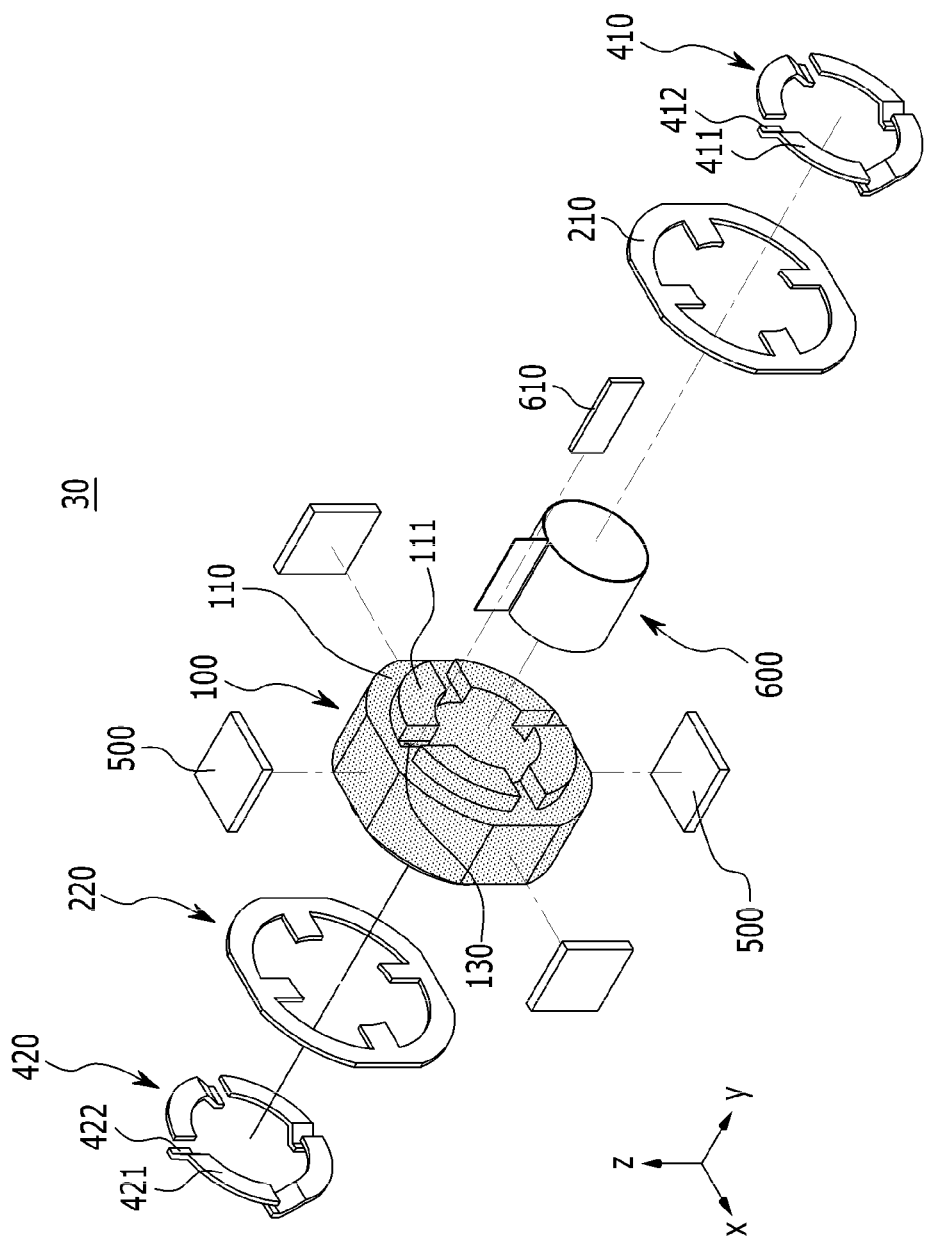
FIG. 11 illustrates an exploded perspective view of an air-foil bearing in accordance with a third exemplary embodiment of the present invention.
Figure 12:
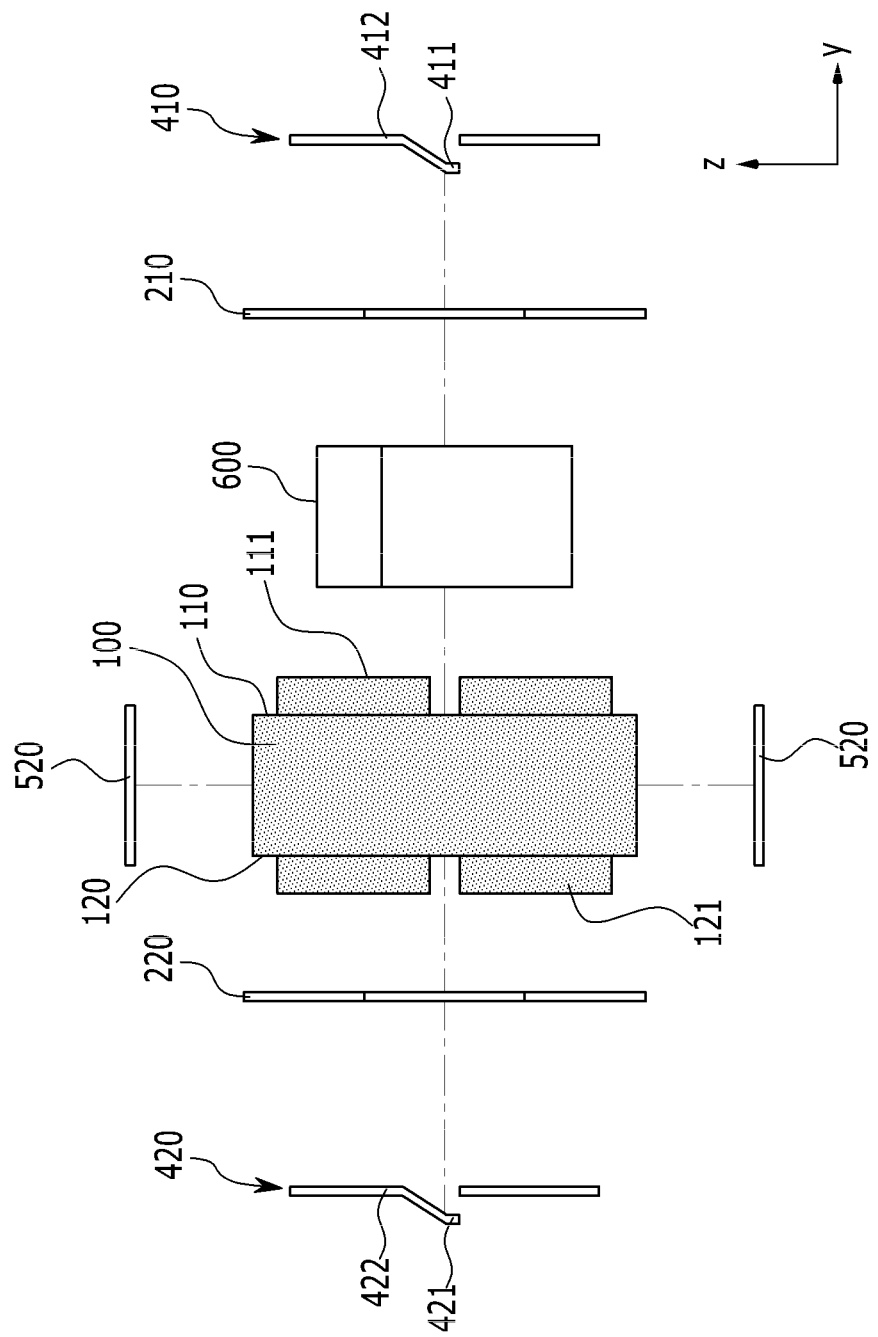
FIG. 12 illustrates an exploded sectional view of an air-foil bearing in accordance with a third exemplary embodiment of the present invention.
Figure 13A:
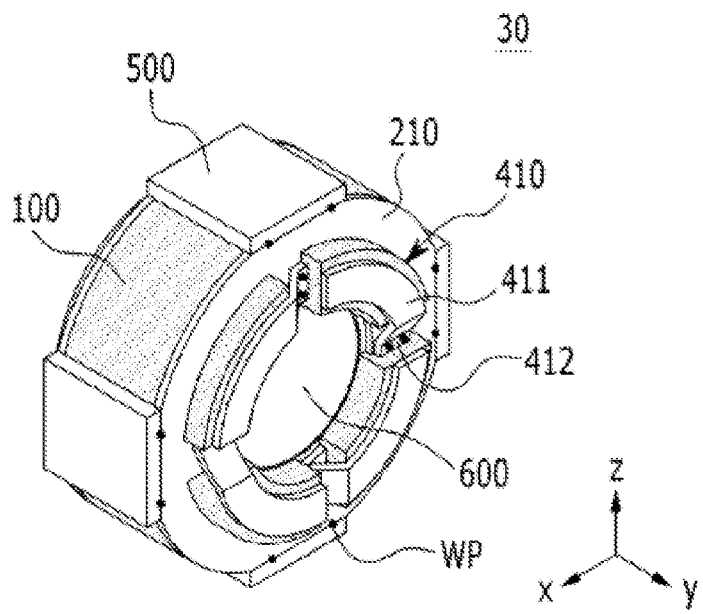
FIGS. 13A to 13B illustrate perspective view of an air-foil bearing in accordance with a third exemplary embodiment of the present invention.
Figure 13B:
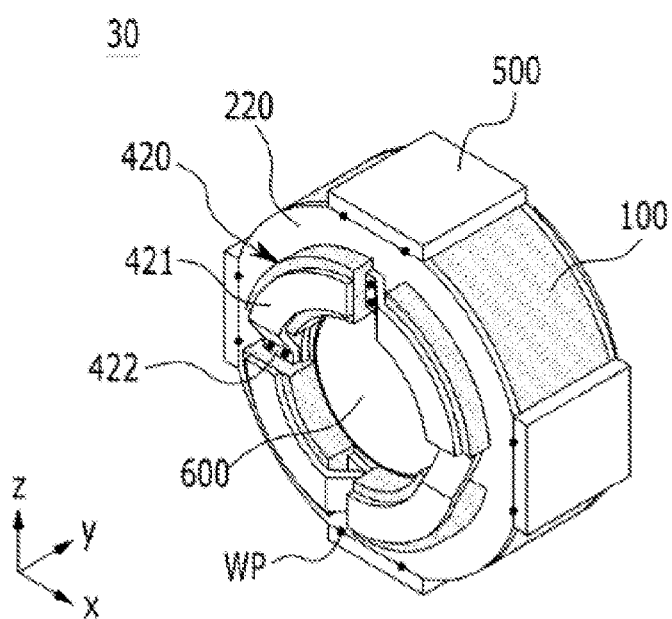

FIGS. 11 to 13 illustrate an air-foil bearing 30 in accordance with a third exemplary embodiment of the present invention, wherein FIG. 11 is an exploded perspective view, FIG. 12 is an exploded sectional view, and FIGS. 13A and 13B are perspective views, respectively.

Referring to FIGS. 11 to 13, the air-foil bearing 30 is identical to the air-foil bearing 20 in accordance with the second exemplary embodiment of the present invention except that a rear protruded portion 121 is formed on the rear body portion 120, and, instead of the back plate 300, a rear welding plate 220 is coupled to the rear body portion 120 and a rear top foil 420 is coupled to the rear protruded portion 121. Members identical to those of the second exemplary embodiment will be given the same reference numerals.

Different from the air-foil bearing 20 in accordance with the second exemplary embodiment in which the top foil is coupled to only one side of the damper body 100 as shown in FIGS. 6 and 7, the air-foil bearing 30 in accordance with the third exemplary embodiment has the top foil coupled to both sides of the damper body 100 as shown in FIGS. 11 and 12 to be symmetrical with respect to a z axis.

That is, similar to the front protruded portion 111, there may be two or more radially arranged rear protruded portions 121, there may be two or more rear top foils 420 in conformity with the number of rear protruded portions 121, and, instead of the back plate 300 of the second exemplary embodiment, a rear welding plate 220 may be secured to the rear body portion 120 to be in surface contact thereto through welding or the like.

Further, to match with the front top foil 410, the rear top foil 420 may include a rear first contact portion 421 in surface contact with a top surface of the rear protruded portion 120, and a rear second contact portion 422 which is a portion that is bent from the rear first contact portion 421 in surface contact with the rear welding plate 220.

Different from the second exemplary embodiment described above, in the third exemplary embodiment, the welding support 500 may be arranged between the front welding plate 210 and the rear welding plate 220, and secured to the front welding plate 210 and the rear welding plate 220 through welding.

Thus, different from the air-foil bearing 20 in accordance with the second exemplary embodiment, the air-foil bearing 30 in accordance with the third exemplary embodiment can support the axial direction load more firmly owing to the top foils coupled to both sides of the damper body.

Figure 14:
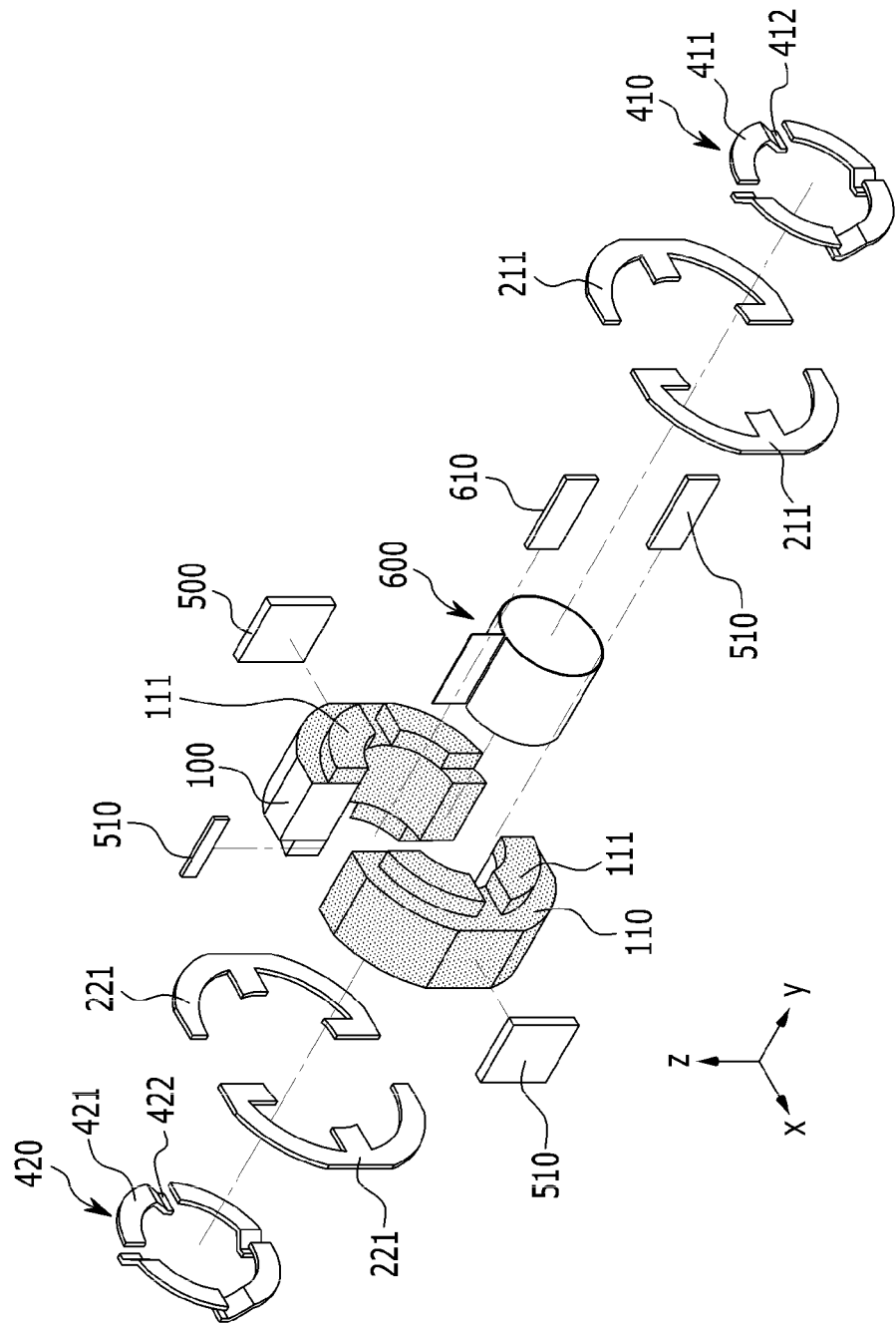
FIG. 14 illustrates an exploded perspective view of an air-foil bearing in accordance with a fourth exemplary embodiment of the present invention.
Figure 15:
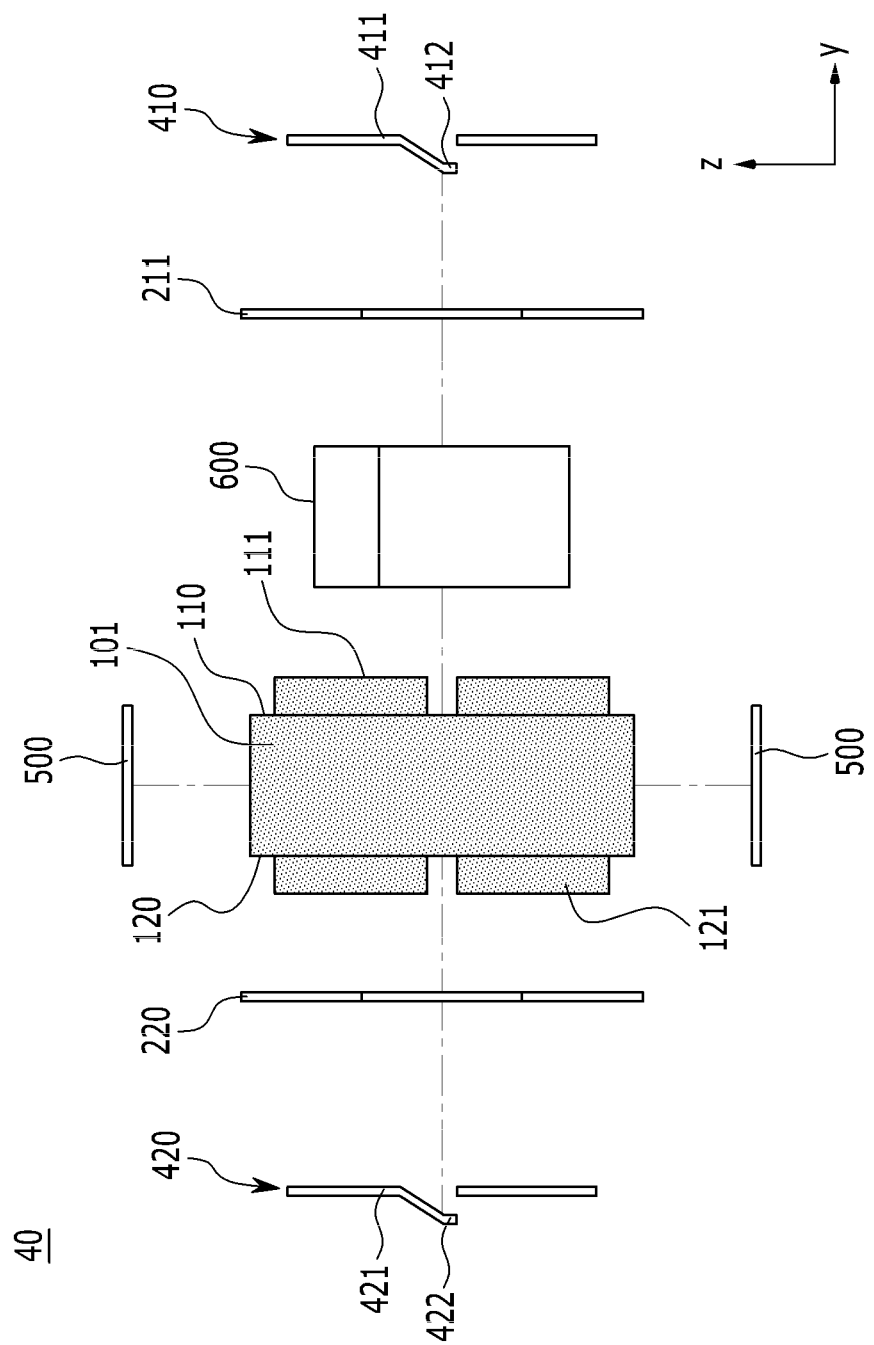
FIG. 15 illustrates an exploded sectional view of an air-foil bearing in accordance with a fourth exemplary embodiment of the present invention.
Figure 16:
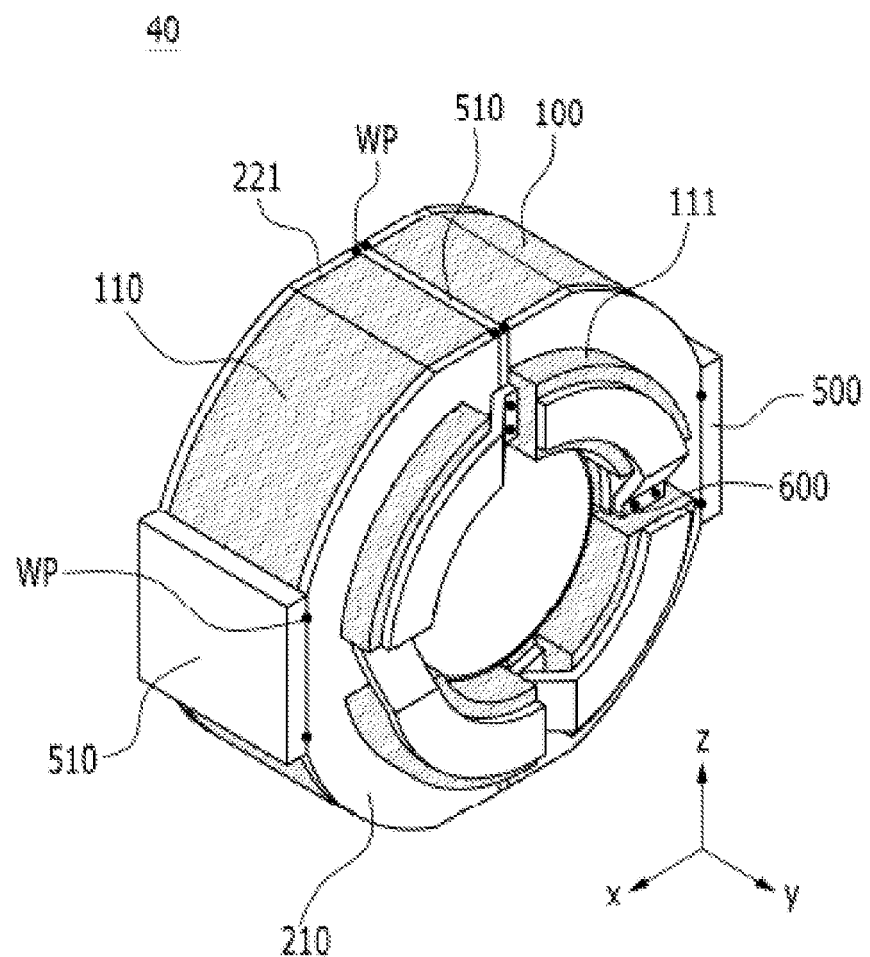
FIG. 16 illustrates a perspective view of an air-foil bearing in accordance with a fourth exemplary embodiment of the present invention.

FIGS. 14 to 16 illustrate an air-foil bearing 40 in accordance with a fourth exemplary embodiment of the present invention, wherein FIG. 14 is an exploded perspective view, FIG. 15 is an exploded sectional view, and FIG. 16 is a perspective view.

Referring to FIGS. 14 to 16, the air-foil bearing 40 has identical construction to the third exemplary embodiment except that a damper body, a front welding plate, and a rear welding plate are divided into two or more unit bodies, respectively, to have a modularized structure. Members identical to those of the third embodiment will be given the same reference numerals.

Two or more unit damper bodies 101 may be coupled to construct the damper body 100. The unit front welding plate 211 and the unit rear welding plate 221 may be in surface contact with the front body portion and the rear body portion of the unit damper body 101, respectively. In the present exemplary embodiment, a unit module 900 is defined to have the unit damper body 101, the unit front welding plate 211, and the unit rear welding plate 221.

The unit module 900 may have one or more front protruded portions 111 and rear protruded portions 120 arranged therein, and one or more front and rear top foils 410 and 420 provided therein to match therewith.

The welding support 500 may be arranged to be respectively connected to the unit front welding plate 211 and the unit rear welding plate 221 in contact with a side of the unit damper body 101. The welding support 500 may have at least one thereof secured to the unit welding plate 211 and the unit rear welding plate 221 through welding. In the present exemplary embodiment, the welding support 500 may be arranged on an outer circumferential surface of the damper body 100.

In general, if the unit damper body 101 is constructed of the metal mesh material, a problem may be caused in that adjacent unit dampers 101 are difficult to couple to each other. In order to solve this problem, the air-foil bearing 40 may further include a bridge 510.

Referring to FIG. 14, the bridge 510 may be arranged at a coupling point of two adjacent unit modules 900. The bridge 510 may be connected and secured to the unit front welding plate 211 and the unit rear welding plate 221, respectively.

Thus, by arranging the bridge 510 at the coupling point between the two adjacent unit modules 900, enabling to couple and secure the unit damper bodies 101 that are different from each other to opposite sides of the bridge 510 with welding or the like, the air-foil bearing 40 can maintain a shape of the damper body 100 of the metal mesh material even if the air-foil bearing 40 is constructed of two or more unit modules 900.

FIGS. 17 (a) to (f) illustrate perspective views showing the steps of assembling the air-foil bearing 40 in accordance with the fourth exemplary embodiment of the present invention.

FIG. 17 (a) illustrates a perspective view of one pair of the unit front welding plates 211 and one pair of the unit rear welding plates 221 secured with the welding support 500. FIG. 17 (b) illustrates a perspective view of the unit module 900 having the unit damper body 101 with the front protruded portion 111 and the rear protruded portion 121 formed on opposite sides of a body portion arranged between the unit front welding plate 211 and the unit rear welding plate 221.

FIG. 17 (c) illustrates a perspective view of the bridge 510 arranged at the coupling point between one pair of unit modules 900. In the present exemplary embodiment, since there are two coupling points between the unit modules, as shown in FIG. 17 (c), one bridge 510 may be arranged to each of the coupling points. FIG. 17 (d) illustrates a perspective view of one pair of unit modules 900 adjacent to each other and coupled together. In this case, the bridge 510 and the unit damper body 101 may be secured to each other at a spot welding portion WP. Moreover, the coupling between the unit modules 900 forms the holding slot 130 in the damper body 100.

FIGS. 17A to 17F illustrate perspective views showing the steps of assembling the air-foil bearing 40 in accordance with the fourth exemplary embodiment of the present invention.

Figure 17A:
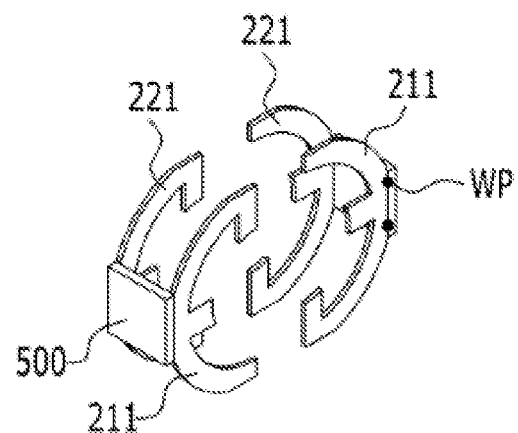
FIGS. 17A to 17F illustrate perspective views showing the steps of assembling an air-foil bearing in accordance with a fourth exemplary embodiment of the present invention.
Figure 17B:
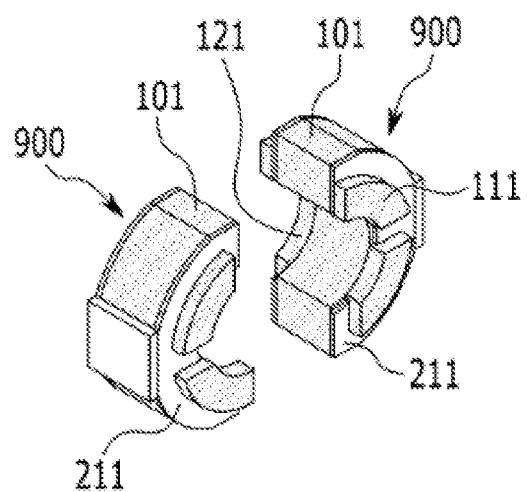

FIG. 17A illustrates a perspective view of one pair of the unit front welding plates 211 and one pair of the unit rear welding plates 221 secured with the welding support 500. FIG. 17B illustrates a perspective view of the unit module 900 having the unit damper body 101 with the front protruded portion 111 and the rear protruded portion 121 formed on opposite sides of a body portion arranged between the unit front welding plate 211 and the unit rear welding plate 221.

Figure 17C:
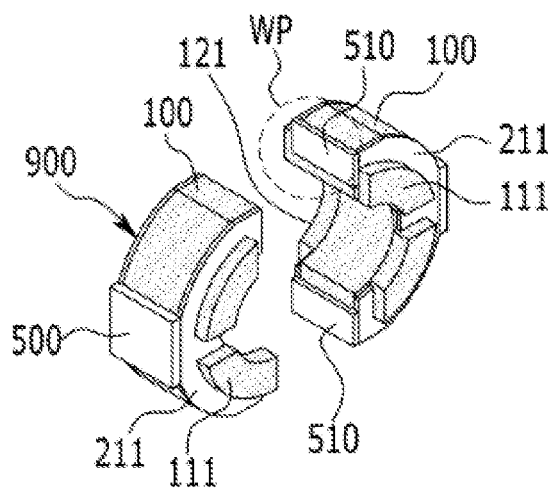
Figure 17D:
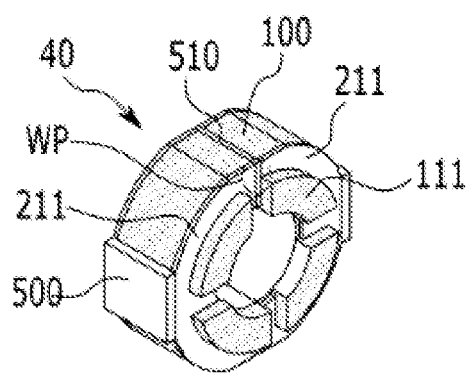

FIG. 17C illustrates a perspective view of the bridge 510 arranged at the coupling point between one pair of unit modules 900. In the present exemplary embodiment, since there are two coupling points between the unit modules, as shown in FIG. 17C, one bridge 510 may be arranged to each of the coupling points. FIG. 17D illustrates a perspective view of one pair of unit modules 900 adjacent to each other and coupled together. In this case, the bridge 510 and the unit damper body 101 may be secured to each other at a spot welding portion WP. Moreover, the coupling between the unit modules 900 forms the holding slot 130 in the damper body 100.

Figure 17E:
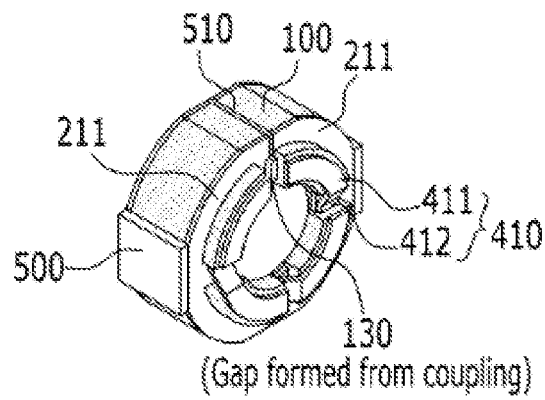
Figure 17F:
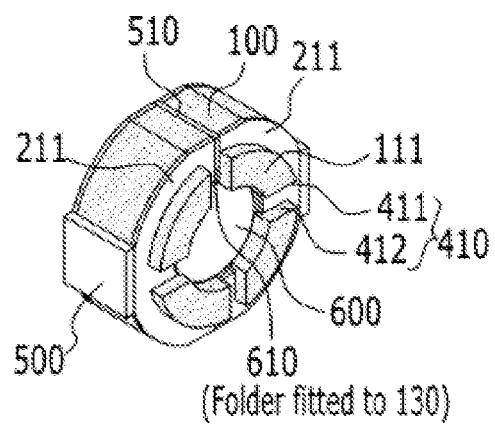

FIG. 17E illustrates a perspective view of the top foil 410 coupled to the front protruded portion 111, and the rear top foil 420 coupled to the rear protruded portion 121. FIG. 17F illustrates a perspective view of an assembly of the air-foil bearing 40 having the radial foil 600 and the fixing part 610 placed in and secured to the holding slot 130.

Figure 18A:
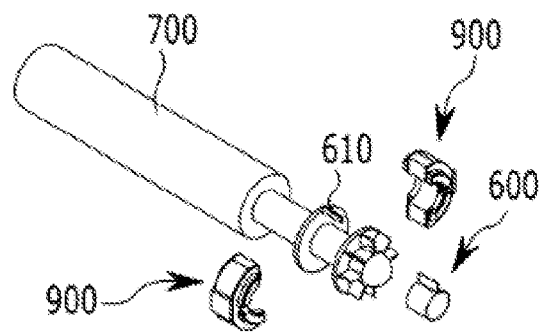
FIGS. 18A to 18D illustrate perspective views showing the steps of applying an air-foil bearing in accordance with a fourth exemplary embodiment of the present invention to an integrated shaft.
Figure 18B:
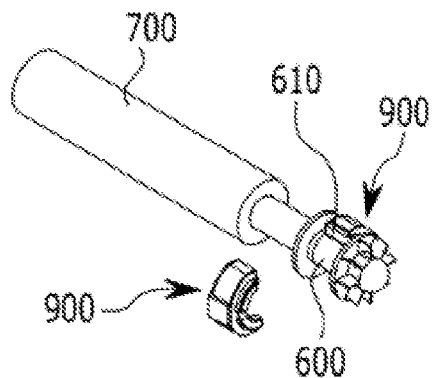
Figure 18C:
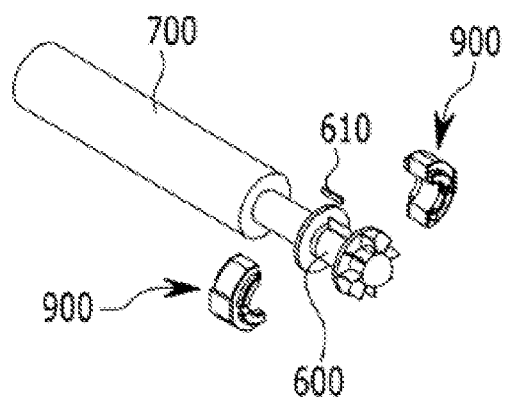
Figure 18D:
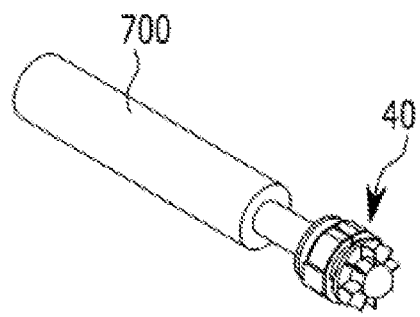
Figure 19:
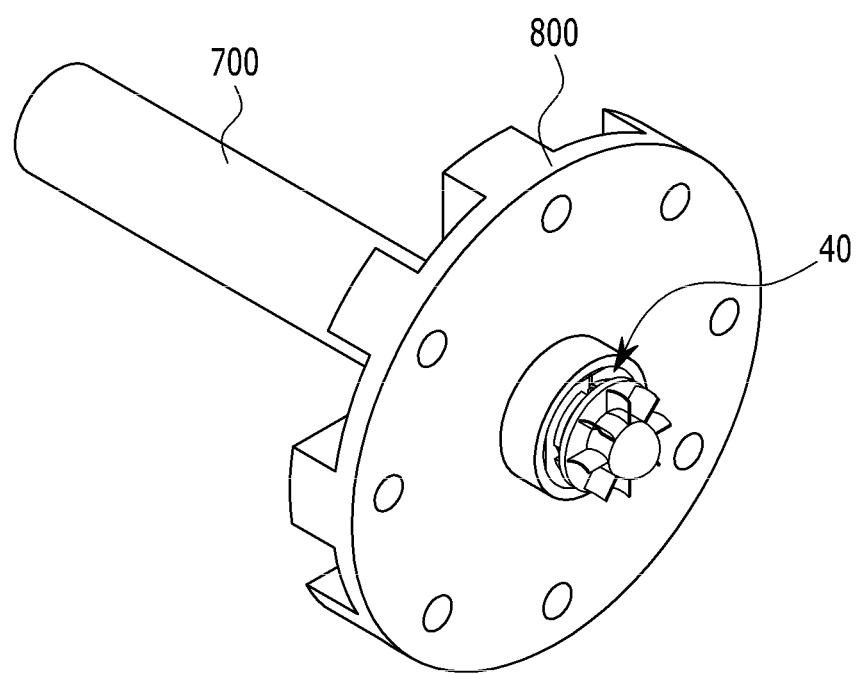
FIG. 19 illustrates a perspective view of an air-foil bearing in accordance with a fourth exemplary embodiment of the present invention applied to an integrated shaft.

FIGS. 18A to 18D illustrate perspective views showing the steps of coupling an air-foil bearing 40 in accordance with the fourth exemplary embodiment of the present invention to an integrated shaft 700, and FIG. 19 illustrates a perspective view of a modular assembly having an air-foil bearing 40 in accordance with the fourth exemplary embodiment of the present invention applied thereto.

FIGS. 18A to 18D illustrate perspective views showing the steps of applying an air-foil bearing 40 in accordance with the fourth exemplary embodiment of the present invention to an integrated shaft 700, and FIG. 19 illustrates a perspective view of an air-foil bearing 40 in accordance with the fourth exemplary embodiment of the present invention applied to an integrated shaft 700.

By mounting the radial foil 600 to the integrated shaft 700 as shown in FIG. 18A, arranging the fixing part 610 as shown in FIG. 18 (b), and coupling one pair of the unit modules 900 adjacent to each other as shown in FIG. 18C, the air-foil bearing 40 may be mounted to the integrated shaft 700 as shown in FIG. 18D.

Then, as shown in FIG. 19, by mounting a housing 800 to an outside circumference of the air-foil bearing 40, a position of the air-foil bearing 40 may be fixedly secured to the integrated shaft 700.

Thus, by constructing the air-foil bearing 40 in accordance with the fourth exemplary embodiment of the present invention to be able to separate into two or more unit modules 900, the air-foil bearing 40 has an advantage in that the air-foil bearing 40 can be mounted even to the small-sized rotating body, such as the compressor or the turbine, where mounting of the bearing thereto is impossible or difficult.

As has been described, the air-foil bearing provided by the present invention can provide enhanced durability by using the pressed metal mesh of a fixed density, a large effect when applied to the small rotating body by providing a radial bearing and a thrust bearing as one bearing to simplify construction of the bearing, an increased first bending mode owing to a short total length of the rotating body, and an advantage in that the air-foil bearing can be mounted even to the small rotating body such as the compressor or the turbine to which mounting of the bearing is impossible or difficult by constructing the air-foil bearing to be able to separate into two or more unit modules.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An air-foil bearing comprising:
    a damper body having a front body portion, a rear body portion, and at least one front protruded portion protruded upward from the front body portion to have a flat protruded surface;
    a front welding plate in surface contact with the front body portion; and at least one front top foil having a front first contact portion in surface contact with a top surface of the front protruded portion, and a front second contact portion which is a portion that is bent from the front first contact portion in surface contact with the front welding plate.

2. The air-foil bearing of claim 1, wherein the damper body is constructed of a metal mesh material.

3. The air-foil bearing of claim 1, further comprising a back plate in surface contact with the rear body portion.

4. The air-foil bearing of claim 3, further comprising two or more welding supports arranged between the front welding plate and the back plate in contact with sides of the damper body, respectively.

5. The air-foil bearing of claim 1, wherein there are two or more front protruded portions arranged radially, and there are two or more front top foils matched with the number of front protruded portions.

6. An air-foil bearing comprising:
a damper body having a front body portion, a rear body portion, and a front protruded portion protruded upward from the front body portion to have a flat protruded surface;
a front welding plate in surface contact with the front body portion;
a front top foil having a front first contact portion in surface contact with a top surface of the front protruded portion, and a front second contact portion which is a portion that is bent from the front first contact portion in surface contact with the front welding plate;
a radial foil placed in, and secured to, a holding slot in the damper body; and
a back plate in surface contact with the rear body portion.

7. The air-foil bearing of claim 6, wherein the damper body is constructed of a metal mesh material.

8. The air-foil bearing of claim 6, further comprising two or more welding supports arranged between the front welding plate and the back plate in contact with sides of the damper body, respectively.

9. The air-foil bearing of claim 6, further comprising a fixing part for securing the radial foil to the damper body, and the radial foil is placed in the holding slot together with the fixing part after the radial foil is coupled to the fixing part.

10. The air-foil bearing of claim 6, wherein there are two or more front protruded portions arranged radially, and there are two or more front top foils matched with the number of front protruded portions.

11. An air-foil bearing comprising:
a damper body having a front body portion, a rear body portion, at least one front protruded portion protruded upward from the front body portion to have a flat protruded surface, and at least one rear protruded portion protruded downward from the rear body portion to have a flat protruded surface;
a front welding plate in surface contact with the front body portion;
at least one front top foil having a front first contact portion in surface contact with a top surface of the front protruded portion, and a front second contact portion which is a portion that is bent from the front first contact portion in surface contact with the front welding plate;
a rear welding plate in surface contact with the rear body portion; and
at least one rear top foil having a rear first contact portion in surface contact with a top surface of the rear protruded portion, and a rear second contact portion which is a portion that is bent from the rear first contact portion in surface contact with the rear welding plate.

12. The air-foil bearing of claim 11, wherein the damper body is constructed of a metal mesh material.

13. The air-foil bearing of claim 12, comprising two or more unit modules including the damper body, the front welding plate and the rear welding plate each of which is separable into two or more units bodies.

14. The air-foil bearing of claim 13, wherein the unit modules are coupled together to form a holding slot in the damper body, and a radial foil is placed in, and secured to, the holding slot.

15. The air-foil bearing of claim 14, further comprising at least one welding support connected to the unit front welding plate and the unit rear welding plate in contact with a side of the unit damper body.

16. The air-foil bearing of claim 14, further comprising a bridge arranged at a coupling point of two adjacent unit modules.

17. The air-foil bearing of claim 14, wherein the radial foil further includes a fixing part for securing the radial foil to the damper body.

18. The air-foil bearing of claim 11, further comprising a radial foil placed in, and secured to, a holding slot in the damper body.

19. The air-foil bearing of claim 18, further comprising a fixing part for securing the radial foil to the damper body, and the radial foil is placed in the holding slot together with the fixing part after the radial foil is coupled to the fixing part.

20. The air-foil bearing of claim 11, wherein there are two or more front protruded portions arranged radially, and there are two or more front top foils matched with the number of front protruded portions.

21. The air-foil bearing of claim 11, wherein there are two or more rear protruded portions arranged radially, and there are two or more rear top foils matched with the number of rear protruded portions.

22. The air-foil bearing of claim 11, further comprising two or more welding supports arranged between the front welding plate and the rear welding plate in contact with sides of the damper body, respectively.

* * * * *